United States Patent
Grandy

(10) Patent No.: US 9,876,422 B2
(45) Date of Patent: Jan. 23, 2018

(54) RF NOISE REDUCTION IN SWITCHING MODE POWER SUPPLIES

(71) Applicant: TRW Automotive U.S. LLC, Livonia, MI (US)

(72) Inventor: Mark Emerson Grandy, Livonia, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 175 days.

(21) Appl. No.: 14/181,936

(22) Filed: Feb. 17, 2014

(65) Prior Publication Data

US 2015/0236585 A1    Aug. 20, 2015

(51) Int. Cl.
*H02M 1/44* (2007.01)
*H02M 3/156* (2006.01)
*H02M 1/00* (2006.01)

(52) U.S. Cl.
CPC ............ *H02M 3/156* (2013.01); *H02M 1/44* (2013.01); *H02M 2001/0051* (2013.01)

(58) Field of Classification Search
CPC ......................... H02M 2001/0051; H02M 1/44
See application file for complete search history.

(56) References Cited

U.S. PATENT DOCUMENTS

| | | | | |
|---|---|---|---|---|
| 5,160,896 A * | 11/1992 | McCorkle | ............. | H03F 3/2171 327/31 |
| 5,425,040 A * | 6/1995 | Krawczak | ............... | H01S 5/042 323/282 |
| 6,304,137 B1 * | 10/2001 | Pullen | ............. | H02M 1/44 330/10 |
| 6,762,645 B1 * | 7/2004 | Grant | ............. | H03F 3/19 323/282 |
| 7,268,410 B1 * | 9/2007 | Hopper | ............. | H02M 7/003 257/379 |
| 2009/0072124 A1 * | 3/2009 | Schofield | ............. | G05D 1/0244 250/208.1 |
| 2013/0015836 A1 * | 1/2013 | Chang | ............. | H02M 3/155 323/351 |
| 2013/0082624 A1 * | 4/2013 | Brassfield | ............. | H05B 33/0818 315/297 |

OTHER PUBLICATIONS

Vishay Dale; ILBB-0805 Datasheet, Revison 21, Jun. 2011, pp. 1-6.*
Toshiba Materials Co; Amorphous Noise Suppression Devices "AMOBEADS" Dec. 2008, pp. 1-12.*

* cited by examiner

*Primary Examiner* — Harry Behm
(74) *Attorney, Agent, or Firm* — Tarolli, Sundheim, Covell & Tummino LLP

(57) ABSTRACT

A switching mode power supply generating reduced high frequency noise. The power supply includes a solid state switch, a modulator for driving the solid state switch with a periodic pulse drive signal, an output filter at the output of the solid state switch, where the output filter includes an inductor and a catch diode. A damping element is included for damping current spikes through the catch diode when said solid state switch turns on and thus reduce noise pulses that would otherwise be introduced by the current spikes.

12 Claims, 4 Drawing Sheets

RF NOISE REDUCTION IN SWITCHING MODE POWER SUPPLIES

FIELD OF THE INVENTION

The present invention is directed to high frequency noise reduction in switching mode power supplies.

BACKGROUND

Motor vehicles today are equipped with highly sophisticated electronic systems. The 12V batteries typically found in motor vehicles provide a ready source of electrical energy for such systems, but the battery voltage is generally too high and also quite unstable. Buck-type switching mode power supplies ("SMPS") are therefore sometimes used to convert the vehicle battery voltage to the lower, more stable voltage needed to power a particular system or subsystem. This type of SMPS receives the unregulated battery voltage and converts it into stable direct current power at a lower voltage of, e.g., 5V or 3.3V. SMPS which perform this type of voltage conversion are referred to as a 'buck' type SMPS because the supply voltage at the output of the SMPS is lower than the source voltage at the input to the SMPS. For the remainder of this document SMPS shall refer to 'Buck' type SMPS.

Some electronic systems used within motor vehicles are sensitive to radio frequency noise such as radio frequency interference ("RFI") and electromagnetic interference ("EMI"). It is therefore desirable that all systems used within the motor vehicle, including any power supplies, be carefully designed to contribute as little high frequency noise as possible.

SUMMARY OF THE INVENTION

The present invention provides a buck-type switching mode power supply that generates reduced levels of high frequency noise.

In accordance with one example embodiment of the present invention, a switching mode power supply is provided. The switching mode power supply includes a solid state switch. A modulator drives the solid state switch with a periodic pulse drive signal. An output filter at the output of the solid state switch includes at least an inductor and a catch diode. A damping element is included to damp current spikes through the catch diode upon turn-on of the solid state switch and thus reduce noise pulses that would otherwise be introduced by the current spikes.

Also, a method is disclosed for providing electrical power using a switching mode power supply. A solid state switch is provided. The solid state switch is driven with a modulated periodic pulse drive signal. The output of the solid state switch is filtered using an inductor and a catch diode. Current spikes through the catch diode are damped upon turn on of the solid state switch so as to reduce noise pulses that would otherwise be introduced by the current spikes.

In accordance with a further aspect of the present invention, a vision system for a motor vehicle is provided comprising an imaging sensor, a processor, and a low noise switching mode power supply. The image sensor is adapted for mounting on a motor vehicle so as to view a scene relative to the motor vehicle. The image sensor generates pixel data regarding an image of the scene. The processor processes the pixel data generated from the imaging sensor. The low noise switching mode power supply provides power to at least one of the processor and the imaging sensor, and comprises a solid state switch, a modulator for driving the solid state switch with a periodic pulse drive signal, and an output filter at the output of the solid state switch, where the output filter includes at least an inductor and a catch diode. The low noise switching mode power supply further includes a damping element to suppress parasitic reverse current pulses through the catch diode upon turn on of the solid state switch and thus reduce radio frequency noise pulses that would otherwise be introduced by the current pulses.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
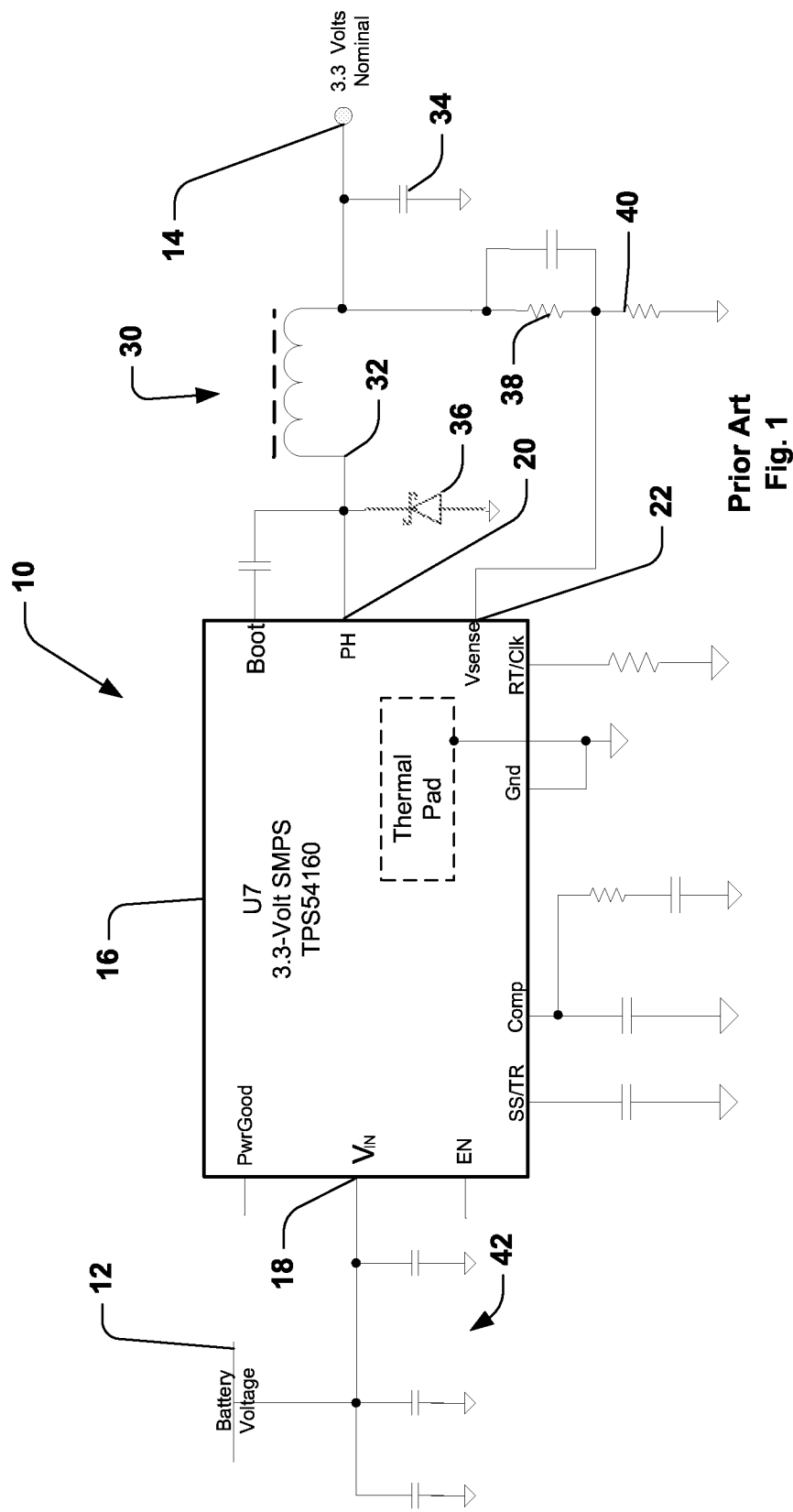
FIG. 1 is a circuit schematic of a known, prior art switching mode power supply.
Figure 2:
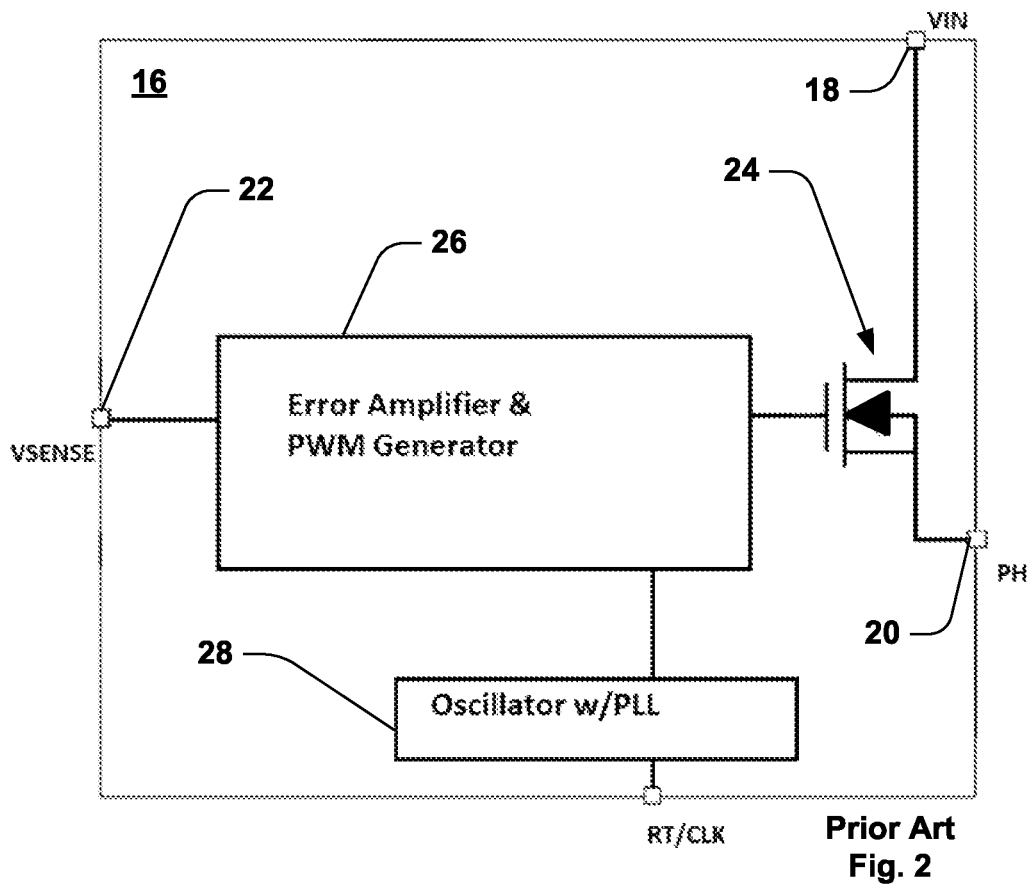
FIG. 2 is a functional block diagram of the integrated circuit used in the circuit of FIG. 1.

Switching mode power supplies ("SMPS") may be implemented using readily available integrated circuits. Texas Instruments offers a SMPS integrated circuit, identified as the TPS54160, that is used in some motor vehicle applications. FIG. 1 is a circuit schematic of one known implementation of a SMPS using the TPS54160. FIG. 2 is a simplified functional block diagram of the main internal blocks of the TPS54160 integrated circuit.

Referring to FIG. 1, SMPS 10 has an input 12 that, in a vehicular application, is connected to the positive terminal of a conventional 12V vehicle battery. A supply output 14 provides the power supply signal from the SMPS to downstream systems. The battery, SMPS, and downstream system are all also connected to a common ground, of course, usually the vehicle chassis.

The heart of SMPS 10 of FIG. 1 is the Texas Instruments TPS54160 integrated circuit 16. The content and operation of integrated circuit ("IC") 16 are known per se and will not be described herein, except in a summary manner. IC 16 has multiple pins for electrical connection of internal components with external components. For present purposes, the relevant connection pins are the voltage supply input pin 18, the pulse modulated output pin 20, and a voltage sense pin 22 that is used for feedback. The function of IC 16 in relation to these three pins may be understood through reference to the simplified block diagram of FIG. 2.

As shown in FIG. 2, IC 16 provides a direct path between the input pin 18 and output pin 20. The path is interrupted only by the source-drain signal path of a MOSFET power switch 24, which is interposed along this path between the input and output pins. MOSFET power switch 24 is turned on and off by a pulse-width modulated ("PWM") drive signal supplied to its gate terminal by a modulation circuit 26, which functions as an error amplifier and pulse width modulator. Alternate renditions of ICs such as 1016 may utilize a bipolar type transistor in lieu of a MOSFET type solid state switch for the same purpose as described above. Modulation circuit 26 responds to a clock signal provided by oscillator 28 and a feedback signal appearing on pin 22 to generate the PWM drive signal. The PWM signal comprises a train of periodic pulses, where the frequency of the pulses matches the frequency of the signal supplied by oscillator 28 and the width of the pulses is modulated in accordance with an error signal generated by an error comparator that is embedded in modulator 26. The error comparator compares the actual magnitude of the feedback signal on pin 22 with the desired magnitude of the output voltage, as represented by an internal reference voltage. If the signal amplitude that is fed back on pin 22 is too high, the modulator 26 will lower the pulse width of the PWM signal. If the feedback signal amplitude is too low, the modulator 26 will raise the pulse width of the PWM signal.

Referring back to FIG. 1, SMPS 10 includes an output filter 30 for converting the PWM signal—which is a pulse signal switching between battery voltage and ground—into a stable DC output voltage. Output filter 30 includes series inductor 32 and a parallel capacitor 34, with the capacitor on the downstream side of inductor 32. A so-called 'catch diode' 36 is included on the upstream side of inductor 32 to free-wheel current through inductor 32 and to prevent the voltage at the IC output pin 20 from going significantly below ground. Catch diode 36, which is usually a Schottky diode, has its cathode connected to the junction between IC output pin 20 and inductor 32, and its anode connected to ground.

As can be seen in FIG. 2, IC 16 has an asynchronous SMPS topology. That is, IC 16 has a single, high-side MOSFET switch rather than two, high-side and low-side switches connected in a push-pull configuration. As such, IC 16 has no low-side MOSFET to free-wheel current when MOSFET 24 is turned 'off.' Instead, catch diode 36 is included to provide a free-wheeling current path and thereby protect output pin 20 from negative voltage spikes. Without catch diode 36, charging current from inductor 32 to capacitor 134 would be cut off and the voltage at IC output pin 20 would be pulled significantly below ground each time MOSFET 24 (FIG. 2) switched 'off'. Catch diode 36 will normally be reverse-biased when MOSFET 24 is 'on' but, each time MOSFET 24 turns 'off', inductor 32 will continue to pull current through catch diode 36 as the magnetic field in the inductor collapses. Thus, at the end of each power pulse from IC 16, catch diode 36 will become forward-biased to carry the current through inductor 32 as the current decays back towards zero. The current decay is rather slow compared to the frequency of the PWM signal, hence catch diode 36 will still be forward-biased and conducting when MOSFET 24 next turns 'on.'

The voltage appearing across capacitor 34 is a filtered signal having a DC amplitude equal to the mean level of the PWM signal generated by IC 16, and represents the output signal of SMPS 10. It is this voltage that is applied to supply output 14. To achieve closed-loop regulation of this voltage, a portion of the voltage is fed back to sense input pin 22 of IC 16 via a voltage divider including resisters 38 and 40. In the manner previously described with respect to FIG. 2, IC 16 will regulate the width of the pulses in the PWM signal at output pin 20, and thus the mean amplitude of the PWM signal, so as to adjust the DC level of the filtered signal recovered by filter 30 and appearing on supply output 14. The voltage at supply output 14 of SMPS 10 is therefore regulated at the desired output voltage, which is 3.3V in the embodiment of FIG. 1.

Filtering is typically also provided at the input pin 18 of IC 16 to condition the supply voltage signal from the vehicle battery. Such filtering in FIG. 1 is provided by an input circuit 42 comprising a set of capacitors, often referred to as bypass capacitors, each connected in parallel across input pin 18, where the capacitors have capacitance and internal resistance characteristics selected to provide the desired filtering.

The SMPS design of FIG. 1 efficiently and effectively provides the stepped down, stable voltage required by associated vehicle electronic systems. However, the inventor has discovered that the power supply generates a certain amount of undesirable high frequency noise. The inventor has, moreover, discovered that the source of the noise is the unexpected high amplitude, short duration parasitic reverse current 'pulse' through catch diode 36 and that certain techniques and design modifications may be employed to significantly reduce the noise by reducing the amplitude of this parasitic reverse current pulse.

As stated previously, catch diode 36 is forward-biased when MOSFET 24 is 'off' and will still be conducting when MOSFET 24 is switched 'on'. Each time MOSFET 24 switches 'off,' inductor 32 will continue to pull current, causing the voltage at the cathode of catch diode 36 to drop below zero, forward-biasing catch diode 36 and bringing it into conduction. Inductor current, which had previously been channeled through MOSFET 24, will now instead pass through catch diode 36 from ground. The diode current will decay towards zero as the magnetic field within inductor 32 slowly collapses. When MOSFET 24 is next switched 'on', however, the energy in inductor 32 will not have completely dissipated and thus current will still be flowing through catch diode 36.

The forward resistance of catch diode 36, when the diode is forward-biased, is quite low. Moreover, diode 36, like all diodes, exhibits a "reverse recovery time" ($T_{rr}$) that is often mentioned in datasheets for diodes. This reverse recovery time is the time that it takes for a forward-conducting diode to stop conducting in reverse, when the diode is suddenly reverse-biased, due to the time it takes for removal of majority carriers (Schottky diodes) or minority carriers (silicon diodes) at the junction of the diode. All diodes will basically act like a piece of wire for a very short time when they are reverse-biased following a forward-biased condition. Consequently, a significant 'spike' or pulse of current will flow in a reverse direction through diode 36 during the $T_{rr}$ time.

Thus, since catch diode 36 is still forward-biased and conducting when MOSFET 24 again turns 'on', the output of MOSFET 24 will effectively experience a brief short circuit to ground through diode 36. The effective short circuit will disappear almost immediately (less than 10 nanoseconds), since the stored charge in the junction of diode 36 will quickly deplete and the diode will thus again become reverse-biased and demonstrate an open-circuit condition. As described above the effective short circuit of catch diode 36 will exist for a very short duration, nevertheless it will be of some sufficient duration to facilitate conducting an extremely rapid current transition (high di/dt) to a high peak level. The high di/dt character of the reverse current pulse, and the subsequent ringing that will occur as the current is rapidly quenched, will produce unwanted high frequency EMI/RFI noise that will be radiated to other nearby electronic systems, as well as conducted over power lines. The noise burst will recur each time MOSFET 24 turns 'on', which is at the rate of the frequency of oscillator 28 and may be more pronounced when the input voltage to the SMPS is greater because the higher input voltage will cause a greater voltage to be developed across Inductor 32 which will thus drive a higher amplitude reverse current pulse through the catch diode 36 when MOSFET 24 turns on.

The inventor has discovered that the noise bursts caused by this periodic and parasitic reverse current pulse through diode 36 may be significantly attenuated by a novel arrangement of circuit elements, e.g. at input pin 18 of IC 16.

Figure 3:
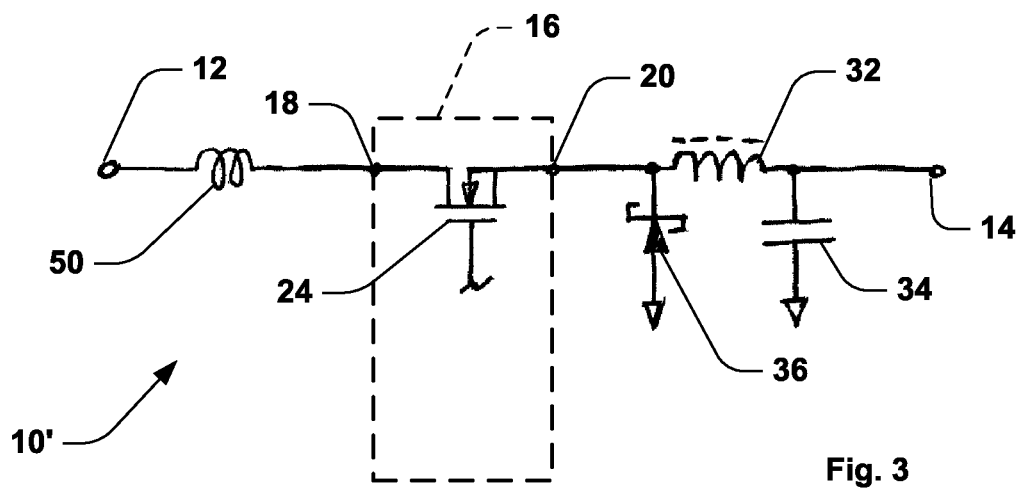
FIG. 3 is a simplified schematic of a switching mode power supply in accordance with one embodiment of the present invention.

FIG. 3 illustrates, in simplified schematic form, the manner in which the SMPS of FIG. 1 may be modified to alleviate the high frequency noise occasioned by the parasitic reverse current pulse through catch diode 36. Elements of FIG. 3 that correspond to equivalent elements of FIG. 1 and FIG. 2 have been identified by corresponding numbers. Thus, in this figure an SMPS 10' is shown having a battery input 12 and a supply output 14. IC 16 has a voltage supply input pin 18 and a pulse modulated output pin 20, and includes an internal MOSFET 24 joining the input pin to the output pin. Output filtering is provided by a filter circuit including inductor 32, capacitor 34, and catch diode 36.

Importantly, a small inductor 50 has now been added in series between battery input 12 and voltage supply input pin 18, and there are no bypass filter capacitors intervening between inductor 50 and voltage supply input pin 18. (Although not shown in FIG. 3, bypass filter capacitors may be added as desired between inductor 50 and battery input 12.) Through these discrete changes, the reverse inrush current pulse through catch diode 36 that would typically be gated through MOSFET 24, each time it turns 'on', is greatly reduced. As such, inductor 50 acts to damp or subdue the high amplitude and short duration parasitic reverse current pulse and attendant noise burst that would otherwise occur, while still allowing the current from MOSFET 24 to rise rapidly enough so as to preserve the intended functioning and efficiency of the SMPS. In effect, the use of inductor 50 as described above eliminates the high frequency noise content from the current switching by MOSFET 24 without interfering with the intended operation of the SMPS.

In one example embodiment of the invention, inductor 50 is a small air-core chip inductor, designed for surface mount use. The coil may then be surface mounted on a printed circuit board very close to voltage supply input pin 18 of IC 16, which is also preferably a surface-mount component. Such inductors are available from Coilcraft Inc. under the 0603CS Series designation.

The inductance of inductor 50 should be carefully selected to block the undesirable reverse current pulse through catch diode 36 while not interfering with the intended operation or efficiency of the SMPS. In this example embodiment of the invention, the SMPS is designed to provide a supply voltage of 3.3 V at a maximum load current level of 1 Ampere ("A"), and has a nominal PWM switching frequency of 1.9 megahertz (MHz). Also in this example embodiment, inductor 32 is 3.3 microhenries ("pH"), capacitor 34 is 22 microfarads (µF), and catch diode 36 is a B260 Schottky diode. In this case, the inductance for inductor 50 is preferably between 40 nanohenries (nH) and 100 nH, and nominally in the middle of the range, e.g. 70 nH.

In systems employing different switching frequencies, output voltages and load currents, output filter components with different values will be employed and the inductance of inductor 50 may be modified to optimize overall noise performance for those specific systems. The inductance of inductor 50 will be selected taking due account that the described noise reduction technique works better by using lower inductance as the switching frequency of the regulator increases, and also as the load current for the supply increases. The goal is to provide sufficient inductance to quell the very high-frequency reverse current pulse at the beginning of each current pulse from IC 16 while not interfering with the bulk of the current pulse from the IC necessary to support the intended operation and performance of the SMPS. If too much inductance is used, it will start to impair the main output current pulse from IC 16 and tend to decrease the output voltage and efficiency of the SMPS to unacceptable levels. An optimal inductance value can in each case be selected in accordance with the above guidelines through heuristic testing of sets of candidate inductors of various inductance values.

It will be noted that the inclusion of a bypass type capacitor between voltage supply input pin 18 and ground would frustrate the purpose of inductor 50 by providing a ready source of electrical energy that essentially would bypass inductor 50. For this reason, the input circuit to the IC should not include a low impedance path around inductor 50 nor include any means of supplying a source of unimpeded voltage directly to input pin 18 such as by the use of a bypass capacitor connected directly to the node between the output of inductor 50 and input pin 18. Accordingly, a significant novelty established in this invention includes providing no bypass type capacitor to the node between inductor 50 and voltage supply input pin 18. In fact the addition of any bypass type capacitance between the output of inductor 50 and input pin 18 actually acts to provide additional unimpeded supply of current for switching by MOSFET 24 so as to increase the amplitude of the offending parasitic reverse current pulse through catch diode 36. It should be noted that the practice of eliminating capacitance at the input pin is quite novel since normal practice, as widely encouraged in literature pertaining to noise reduction for SMPS, actually encourages the addition of capacitance directly to the input pin as a means of reducing high frequency noise from the operation of the SMPS. As such, one would normally try to reduce high frequency noise as generated by a SMPS by adding more bypass type capacitance directly at the voltage supply input pin 18 without realizing that the addition of unimpeded bypass capacitance directly to the input pin of the SMPS ironically exacerbates the potency of the reverse current pulse through the catch diode which produces offending EMI/RFI and thus potentially results in increased levels of EMI/RFI.

In the example embodiment described above, the parasitic and undesirable reverse current pulses through the catch diode are suppressed through the use of an air-core inductor. It will be appreciated that other renditions of inductors may be used in place of the air-core inductor to achieve the same effect. For example, the damping inductor could have a different core material, e.g. ferrite, and could in fact be a so-called 'ferrite bead' of conventional construction. In any case, the inductive property of the candidate damping inductor should prevent very high di/dt from occurring at the onset of each PWM current pulse.

Furthermore, as the noise reduction arises from curtailing the high di/dt reverse current through the catch diode, other embodiments are possible that also accomplish this task. For example, the inductor 50 could be placed with equal effect in series between the pulse modulated output pin 20 and the node formed by the junction of the cathode of the catch diode 36 and the input lead of output filter Inductor 32. Inductor 50 could even be placed directly in series with catch diode 36 (i.e., in series between ground and the anode of the diode, or in series between the cathode of the diode and the circuit node at pulse modulated output pin 20), although the presence of the inductor at this location will slow the turn on (forward conduction) of the diode and result in some negative spike at pin 20 each time MOSFET 24 turns 'off.' In some applications a negative spike of this sort will not be tolerable and this approach will thus not be feasible, but in other applications the negative spike may be acceptable. The amplitude of the undesirable reverse current pulse could be minimized by careful choice of various versions and implementations of current damping devices. For example, the current damping device may be a simple hollow-core ferrite bead which is sleeved over one lead of catch diode 36. In fact, it may be further advantages to sleeve the hollow-core 'bead' over each lead of catch diode 36. Such beads impart inductance to the lead over which they are sleeved and may in some applications provide sufficient current damping without generating unacceptable negative voltage spikes at the pulse modulated output pin 20.

Figure 4:
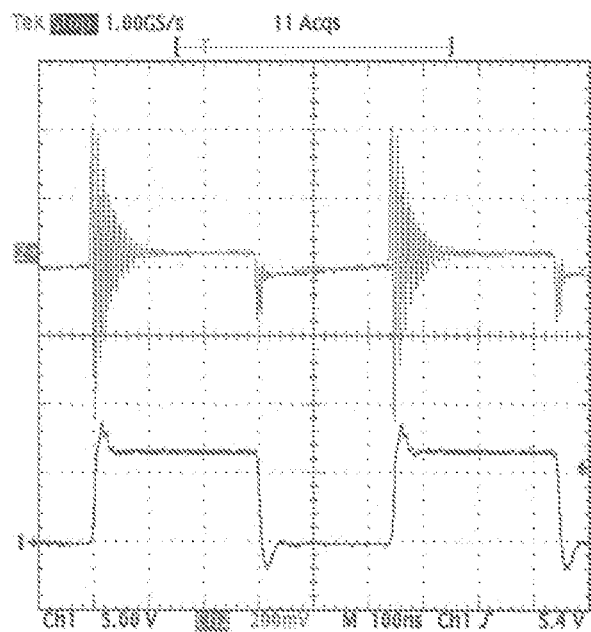
FIGS. 4 and 5 are oscillograms that illustrate the significant improvement produced by the present invention; and, FIG. 6 is a block diagram of system, specifically a forward-looking vision system for a motor vehicle, in which the present invention may advantageously be employed.

FIG. 4 shows oscilloscope traces of the SMPS switching voltage (bottom trace of the figure) and catch diode current (upper trace of the figure) taken from a circuit lacking the noise remediation techniques described above. That is, the circuit producing these traces lacked any inductor or ferrite bead current suppressing element at the input to the SMPS IC, but did include multiple input filtering and bypass capacitors connected directly to the node of the input pin as is normally practiced in the design of contemporary SMPS. As observed in FIG. 4, the catch diode current experiences a large spike, with significant ringing, at the rising edge of each pulse of the PWM signal from the SMPS IC.

Figure 5:
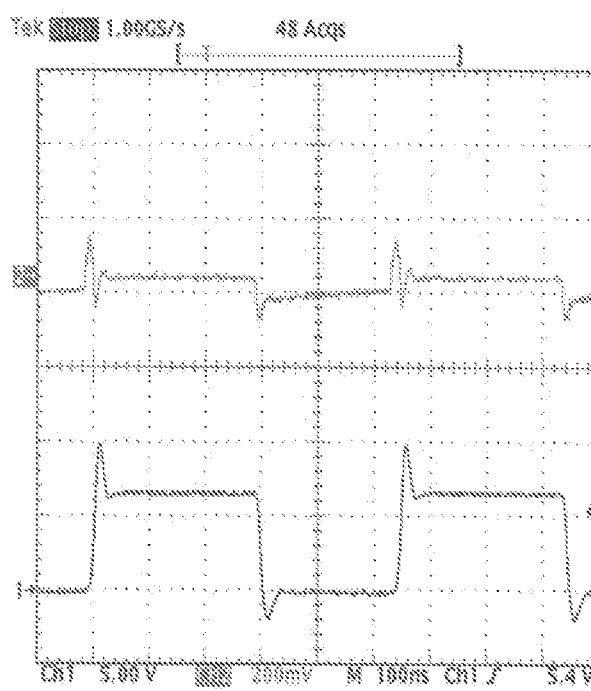

FIG. 5 shows equivalent oscilloscope traces of the same SMPS with its switching voltage (bottom trace of the figure) and catch diode current (upper trace of the figure) collected from the SMPS as it was modified to include a ferrite bead at the input to the SMPS IC, and with no bypass capacitors intervening between the ferrite bead and the input pin of the IC. As observed in FIG. 5, the catch diode current pulse has been significantly attenuated and the ringing reduced. In fact, measurements of RFI/EMI emanating from SMPS with the current profile shown in FIG. 5 do generate less EMI/RFI noise than SMPS with the current profile shown in FIG. 4.

Figure 6:
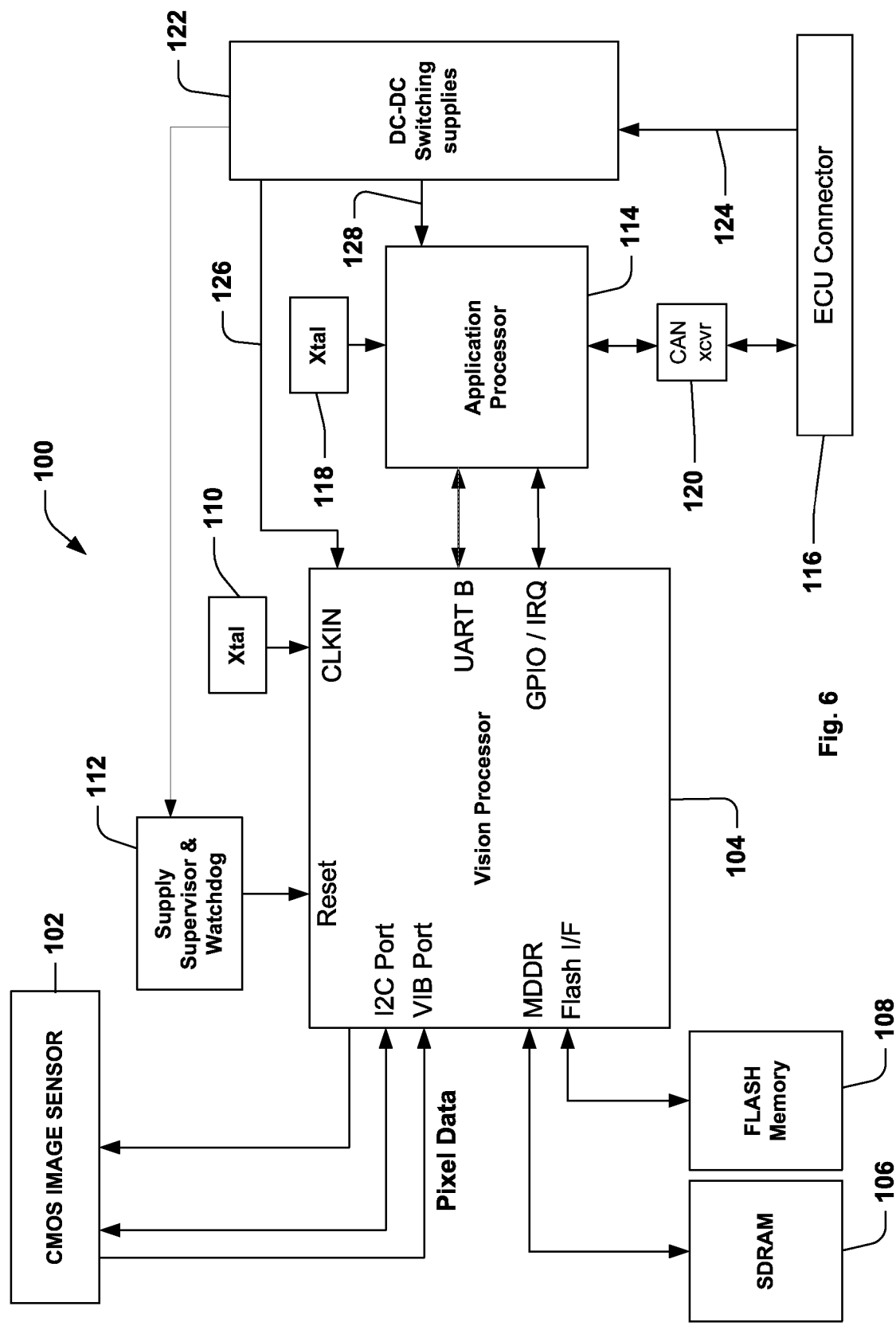

FIG. 6 is a block diagram of a system in which the present invention may be used to achieve the benefits of reduced EMI/RFI. In FIG. 6, the system takes the form of a forward-looking vision system for a motor vehicle. The system 100 is housed in a small enclosure (not shown) that is, in turn, mounted in the top center of the vehicle windscreen. A CMOS image sensor 102 is included in the system and is mounted and positioned within the enclosure so that it views the road ahead through a window in the enclosure and through the windscreen. A special-purpose vision processor 104 processes the pixel data supplied by image sensor 102. Vision processor 104 may have off-chip support circuits, including for example memory components 106 and 108, a clock circuit 110, and a supply supervisor and watchdog circuit 112.

Vision processor 104 analyzes the pixel data from the image sensor to derive image information characterizing features detected in the image of the road ahead, such as highway lane markers, fixed and moving obstacles (e.g. vehicles, pedestrians, and hazardous road debris), road signs, and the like. The vision processor uses the image information in algorithms that perform such control functions as, for example, lane keeping, cruise control and station-keeping, obstacle avoidance, etc. Image processing is a complex and time consuming task requiring significant processor power, and for this reason vision processor 14 is dedicated primarily to the performance of the image processing task.

A secondary or 'application' processor 114 manages the system 100 and provides an interface, via a connector 116, between vision processor 104 and other vehicle systems. In the embodiment presently being described, application processor 114 is an MPC5604E (a.k.a. "Pictus") microcontroller commercially available from Freescale Semiconductor. Application processor 114 includes not only a central processing unit, program memory (ROM) and random access memory (RAM), but also a rich set of built-in peripheral modules. Application processor 114 may have off-chip support circuits as well, such as a clock circuit 118 and a separate CAN transceiver 120.

The circuits that together make up the system 100 require stable electrical power at designated supply voltages and load currents. A set of switching mode power supplies 122 ("SMPSs") receive power from the vehicle battery via power lines 124 routed through connector 26. The SMPSs convert the 12V battery voltage to stable, lower voltages that are used to power vision processor 104, application processor 114, and other system components. For example, SMPS set 122 may include three SMPSs providing supply voltages of 5V, 3.3V, and 1.8V at associated load current capabilities. Power connections from SMPS set 122 to processors 104 and 114 are shown at 126 and 128 respectively. Power connections also exist to other system components, but those connections have been omitted from the drawing for simplicity of illustration. The SMPS techniques described above with respect to FIGS. 1-4 may advantageously be employed in one or more, or indeed in all, of the SMPSs included in set 32.

In the figures and embodiments described, the core of the switching mode power supply is an integrated circuit. Those skilled in the art will recognize that the same inventive concept can as readily be implemented in a switching mode power supply fashioned from discrete components.

Although, in the described embodiment, the catch diode is a discrete device that is external to an asynchronous buck switching mode power supply IC, the catch diode need not be external and discrete. The catch diode may be integrated into the IC. Moreover, the IC may in fact be a synchronous or asynchronous switching mode power supply IC incorporating an element that provides the function of the described catch diode. All such devices are comprehended by the term 'catch diode' as used herein.

In the foregoing description, the function and connection of an example embodiment have been described. However, not all signal lines and circuit components have been exhaustively described because such lines and components are peripheral to the invention and/or because one skilled in the art will readily understand such matters without specific instruction, particularly when informed by the many supporting technical documents that are publicly available for the identified components.

From the above description of the invention, those skilled in the art will perceive improvements, changes and modifications. Such improvements, changes and modifications within the skill of the art are intended to be covered by the appended claims.

Having described the invention, the following is claimed:

1. A switching mode power supply, comprising solid state switch, a modulator for driving said solid state switch with a periodic pulse drive signal, an output filter including at least an inductor and a catch diode, and a damping element to suppress parasitic reverse current pulses through said catch diode upon turn on of said solid state switch and thus reduce noise pulses that would otherwise be introduced by said parasitic reverse current pulses, an integrated circuit implemented in an asynchronous topology comprising said solid state switch being connected in series between said damping element and said output filter, such that the damping element is connected to an input of the integrated circuit comprising said solid state switch, and an output of the integrated circuit comprising said solid state switch is connected to each of said catch diode and said inductor, said inductor being connected to a capacitor.

2. A switching mode power supply as set forth in claim 1, wherein said damping element suppresses parasitic reverse current pulses between said power input and said catch diode.

3. A switching mode power supply as set forth in claim 1, wherein said damping element is an inductor.

4. A switching mode power supply as set forth in claim 3, wherein said damping element has an inductance in the range of 40 to 100 nanohenries.

5. A switching mode power supply as set forth in claim 4, wherein said solid state switch is a MOSFET.

6. A switching mode power supply as set forth in claim 1, wherein said inductor is connected in series with a power output of said solid state switch.

7. A switching mode power supply as set forth in claim 1, wherein said damping element is a ferrite bead.

8. A switching mode power supply as set forth in claim 1, wherein said inductor is a first inductor and said damping element is one of a ferrite bead and a second inductor, wherein an inductance of said first inductor is greater than an inductance of said second inductor or said ferrite bead.

9. A method for providing electrical power using a switching mode power supply comprising the steps of:
providing a damping element connected to a power input,
providing an integrated circuit implemented in an asynchronous topology, comprising a solid state switch, connected to said damping element,
driving said solid state switch with a modulated periodic pulse drive signal,
providing an output filter connected to said integrated circuit, such that the integrated circuit is connected in series between said damping element and said output filter,
filtering the output of said integrated circuit using said output filter, said output filter comprising at least a catch diode an inductor, and a capacitor, and
damping current spikes through said catch diode upon turn on of said solid state switch so as to reduce noise pulses that would otherwise be introduced by said current spikes.

10. A method as set forth in claim 9, wherein the damping element provides an inductance that is so low as not to materially interfere with the switching function of said solid state switch in said switching mode power supply.

11. A method as set forth in claim 10, wherein said inductance is on an order of 40 to 100 nanohenries.

12. A method as set forth in claim 9, wherein said inductor is a first inductor and said damping element is one of a ferrite bead and a second inductor, wherein an inductance of said first inductor is greater than an inductance of said second inductor or said ferrite bead.

* * * * *